(12) United States Patent  (10) Patent No.: US 7,552,502 B2
Kagawa et al.  (45) Date of Patent: Jun. 30, 2009

(54) WIPER APPARATUS WITH COVERING MEMBER

(75) Inventors: Mamoru Kagawa, Kawachi-gun (JP); Tomohiro Ohe, Shioya-gun (JP); Masaomi Tottori, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 741 days.

(21) Appl. No.: 11/096,450

(22) Filed: Apr. 1, 2005

(65) Prior Publication Data

US 2005/0217056 A1 Oct. 6, 2005

(30) Foreign Application Priority Data

Apr. 6, 2004 (JP) ............................. 2004-112189
Oct. 4, 2004 (JP) ............................. 2004-291546

(51) Int. Cl.
*B60S 1/24* (2006.01)
*B60S 1/34* (2006.01)

(52) U.S. Cl. ............................. 15/250.351; 15/250.31; 296/192; 296/96.15

(58) Field of Classification Search ............. 15/250.21, 15/250.351, 250.3, 250.16, 250.29, 250.27, 15/250.31; 296/96.15, 96.17, 192
See application file for complete search history.

(56) References Cited

U.S. PATENT DOCUMENTS

| 1,719,444 | A |   | 7/1929  | Oishei |
|---|---|---|---|---|
| 4,698,873 | A | * | 10/1987 | Aoki et al. ............... 15/250.21 |
| 4,813,099 | A | * | 3/1989  | Kuhbauch ................ 15/250.19 |
| 5,504,966 | A | * | 4/1996  | Lee et al. ................. 15/250.19 |
| 6,119,301 | A |   | 9/2000  | Nakatsukasa et al. |
| 6,564,419 | B2 | * | 5/2003  | Matsumoto et al. ...... 15/250.21 |
| 2006/0005340 | A1 | * | 1/2006 | Boyce ....................... 15/250.3 |

FOREIGN PATENT DOCUMENTS

FR  1 145 453  10/1957
JP  01-229747  9/1989

* cited by examiner

*Primary Examiner*—Gary K Graham
(74) *Attorney, Agent, or Firm*—Rankin, Hill & Clark LLP

(57) ABSTRACT

A wiper apparatus has an operation lever of which one end portion is rotatably equipped, a wiper arm is attached to another end portion of the operation lever, and a covering member which covers a base portion side of the wiper arm and the operation lever, in which an operation hole is formed in a vertical wall of the covering member to allow a base portion of the wiper arm to penetrate through.

6 Claims, 8 Drawing Sheets

WIPER APPARATUS WITH COVERING MEMBER

BACKGROUND OF THE INVENTION

1. Field of the Invention

The present invention relates to a wiper apparatus having a simplified structure without using a linkage.

Priority is claimed on Japanese Patent Application No. 2004-112189, filed Apr. 6, 2004, and Japanese Patent Application No. 2004-291546, filed Oct. 4, 2004, the contents of which are incorporated herein by reference.

2. Description of Related Art

Although, generally in a wiper apparatus, a wiper arm rotates about the center of a pivot axis, thereby performing a wiping operation, recently, a wiping area of the wiper arm is expanded by using a linkage, and thereby the wiping operation is efficiently performed by small movements (Patent Document 1: Japanese Unexamined Patent Application, First Publication No. H1-229747).

Although the wiping area of the wiper arm can be expanded by using the linkage, and thereby an efficient operation can be attained, there is a problem that the structure becomes complicated by using the linkage.

In contrast, although a technique is proposed in which the wiping area is expanded by a simple structure without using the linkage, there is a problem in that the motion of the wiper arm becomes complicated.

SUMMARY OF THE INVENTION

The present invention was made in view of the above circumstances, and objects of the present invention are to provide a wiper apparatus in which the motion of the wiper arm can be simplified, and a large wiping area can be ensured without using the linkage.

In order to solve the above described problems, the present invention is a wiper apparatus having an operation lever of which one end portion is rotatably equipped, a wiper arm attached to another end portion of the operation lever, and a covering member covering a base portion side of the wiper arm and the operation lever, in which an operation hole is formed in a vertical wall of the covering member to allow a base portion of the wiper arm to penetrate through.

According to the present invention, because it is possible for the base portion side of the wiper arm including the operation lever to be covered by the covering member, appearance quality can be improved, while because the wiper arm extends outward from the operation hole, the operation hold is blocked by the wiper arm, and thereby an entry of a foreign matter from this portion to the inside can be prevented.

In the present invention, a penetrating portion of the wiper arm which penetrates the operation hole may be arc-shaped at the center of a rotary shaft of the operation lever.

According to the present invention, even if the operation lever drives, the penetrating portion of the wiper arm which is arc-shaped only moves out and moves in the operation hole, and thereby because a clearance between the penetrating portion of the wiper arm and the operation hole can be lessened as much as possible, the entry of the foreign matter can be reliably prevented.

In the present invention, a cover part may be provided at an outer periphery of the penetrating portion.

According to the present invention, because a direct contact between the wiper arm and the operation hole can be prevented by the cover part, wear or paint peeling of the wiper arm can be prevented. Moreover, because the wear or the paint peeling of the wiper arm can be prevented, a clearance between the wiper arm and the operation hole can be minimized as much as possible.

In the present invention, the covering member may be provided with a vertical wall which is removably attached to the covering member, and an operation hole may be formed in the vertical wall.

By such a constitution, because the vertical wall having the operation hole can be constituted as one part, when the wear due to the operation of the wiper arises, replacement becomes easy.

In the present invention, the covering member may be a cowl top garnish, and the vertical wall may be attached to the cowl top garnish engaging the cowl top garnish.

By such a constitution, because an attachment workability of the vertical wall can be improved, a burden on a worker can be reduced.

In the present invention, the vertical wall may be divided into an upper part and a lower part at a portion in which the operation hole is provided.

According to the present invention, because the attachment operation of the wiper arm can be easy, and when the wiper arm is attached, the wiper arm can be stabilized, the burden on the worker can be further reduced.

In the present invention, the vertical wall may be allowed a predetermined quantity of displacement toward a horizontal direction along an elongation direction.

According to the present invention, because a dispersion of an operation range due to an attachment error of the wiper arm can be absorbed, the entry of the foreign matter can be reliably prevented.

DETAILED DESCRIPTION OF THE INVENTION

Next, an embodiment of the present invention is explained with reference to figures.

Figure 1:
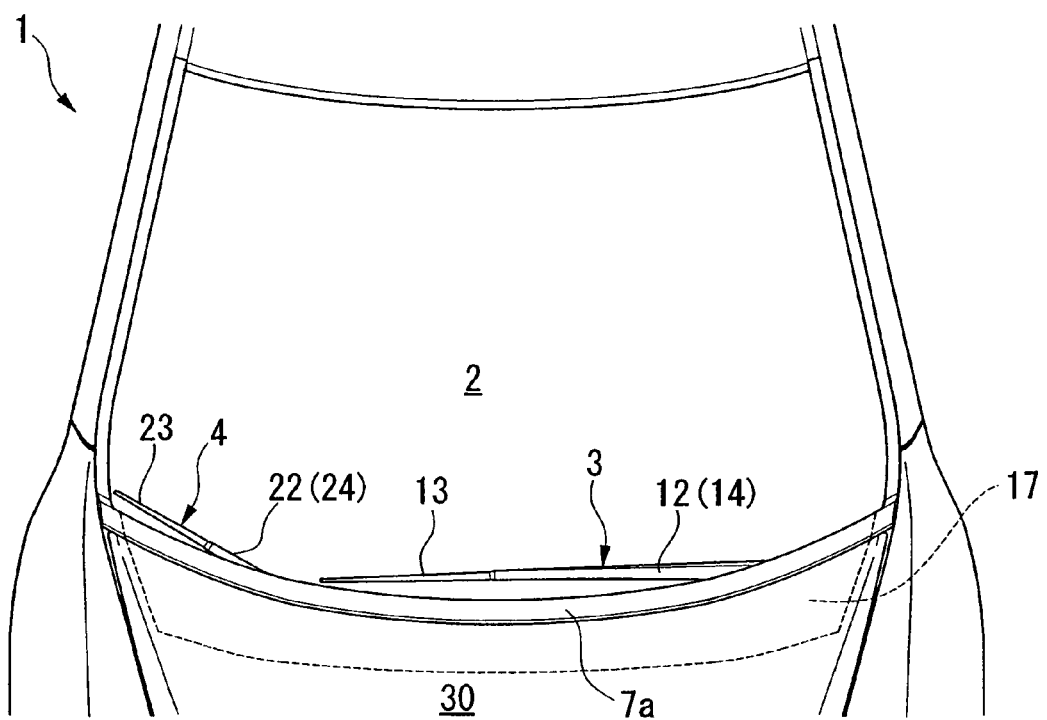
FIG. 1 is a front portion perspective view of a vehicle which shows a attachment state of a wiper apparatus according to the embodiment of the present invention.
Figure 2:
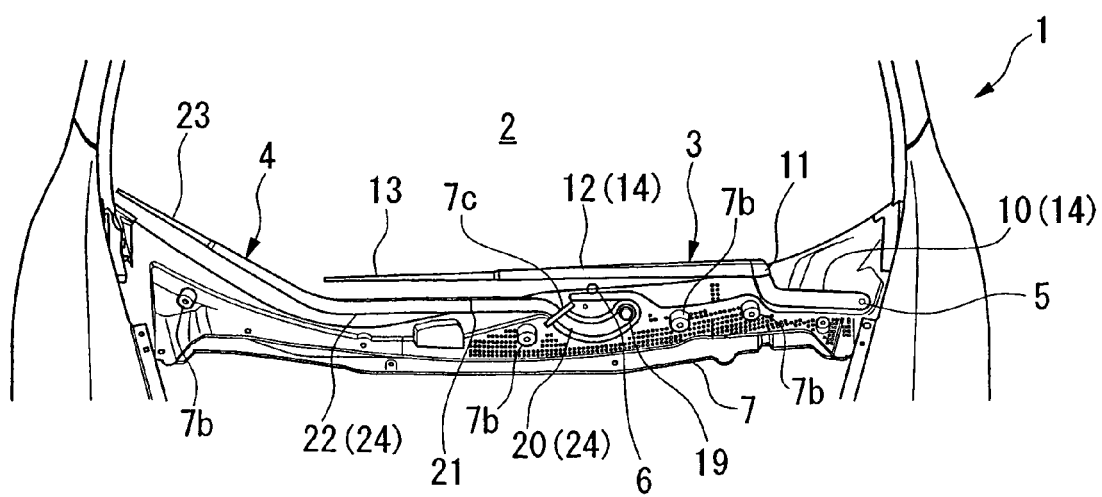
FIG. 2 is a perspective view as in FIG. 1 without the hood and the cowl top upper garnish in FIG. 1.
Figure 3:
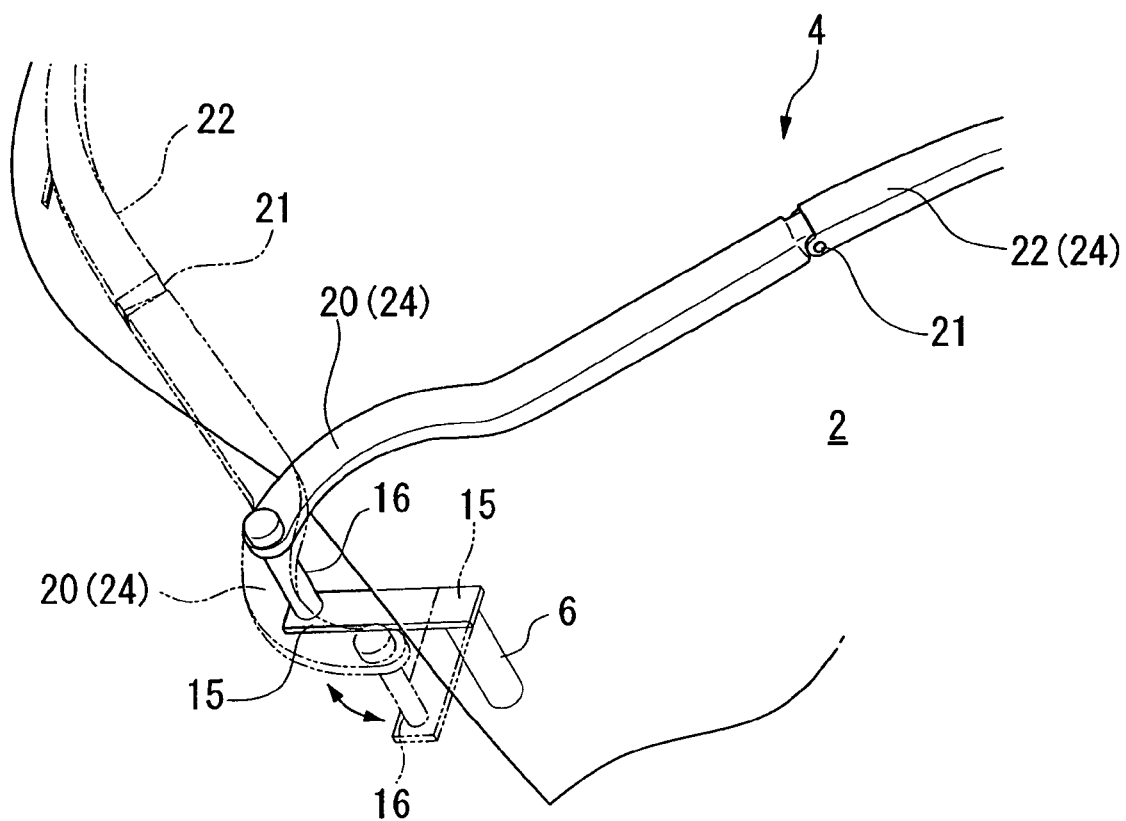
FIG. 3 is a principal portion perspective view which shows an operation state of a second wiper apparatus.

As shown in FIG. 1 and FIG. 2, a pair of wiper apparatuses 3 and 4 which wipe a front window glass 2 are provided in a vehicle 1. Each wiper apparatus 3 and 4 is connected to a pivot axis 5 or a pivot axis (rotary axis) 6 which are rotated by a driving device (which is not shown in the figure). In the first wiper apparatus 3 at a left side of a vehicle body, the pivot axis 5 is set at the left end, and the pivot axis 5 is projected from a cowl top garnish (covering member) 7 which is arranged at the lower portion of the front window glass 2 in a vehicle width direction. Furthermore, an arm base portion 10 is attached to the pivot axis 5, a shank 12 is supported by the arm base portion 10 via a hinge portion 11 so that the shank 12 can stand elastically, and a wiper blade 13 is shakably supported by a front end portion of the shank 12. A wiper arm 14 of the first wiper apparatus 3 is composed of the arm base portion 10 and the shank 12. Furthermore, the second wiper apparatus 4 which is an important part of the embodiment of the present invention is provided at a right side of the vehicle body. As shown in FIG. 3, the second wiper apparatus 4 is provided with an operation lever 15 of which one end portion is rotatably equipped at the center of the pivot axis 6. A supporting shaft 16 which projects upward is provided to another end portion of the operation lever 15.

The supporting shaft 16 moves drawing an arc with the operation lever 15 which rotates about the center of the pivot axis 6. The supporting shaft 16 is arranged slightly left of a central portion of the vehicle body. Furthermore, an arc-shaped arm base portion (penetrating portion) 20 which is formed along an arc-shaped moving locus of the supporting shaft 16 which rotates about the center of the pivot axis 6 is fixed to the supporting shaft 16.

A shank 22 is supported at a front end portion of the arc-shaped arm base portion 20 via a hinge portion 21 so that the shank 22 can stand elastically, and a wiper blade 13 is shakably supported by a front end portion of the shank 22. The wiper arm 24 of the second wiper apparatus 4 is composed of the arc-shaped arm base portion 20 and the shank 22.

Furthermore, a cowl top upper garnish (covering member) 7a is provided at a position in which the base portion side of the wiper arm 14 of the first wiper apparatus 3 is covered, and the base portion of the wiper arm 24 of the second wiper apparatus 4 and the operation lever 15 are covered. Here, the cowl top upper garnish 7a is attached to an attachment seat 7b of the cowl top garnish 7.

Figure 4:
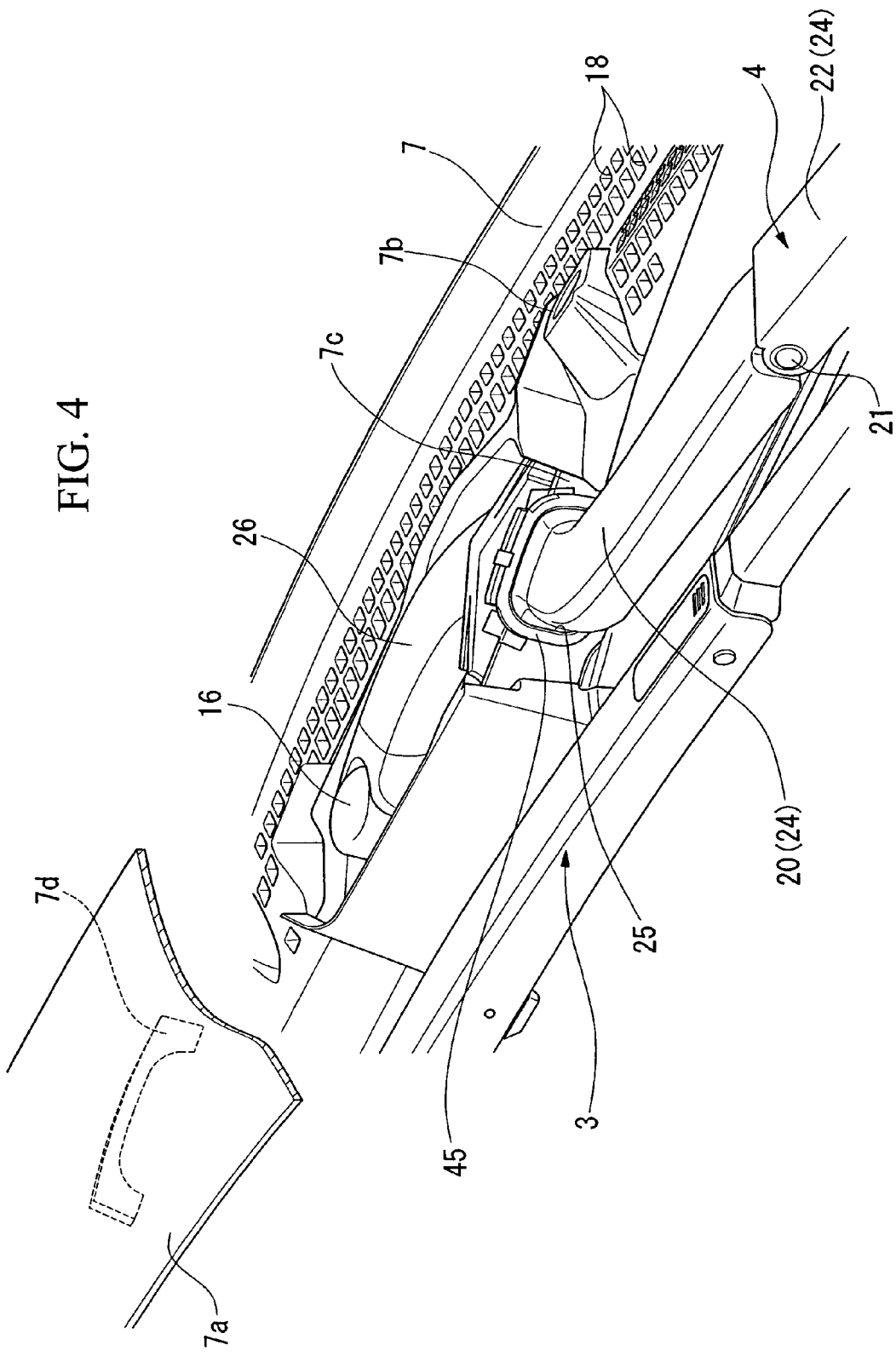
FIG. 4 is a principal portion perspective view of FIG. 2.
Figure 5:
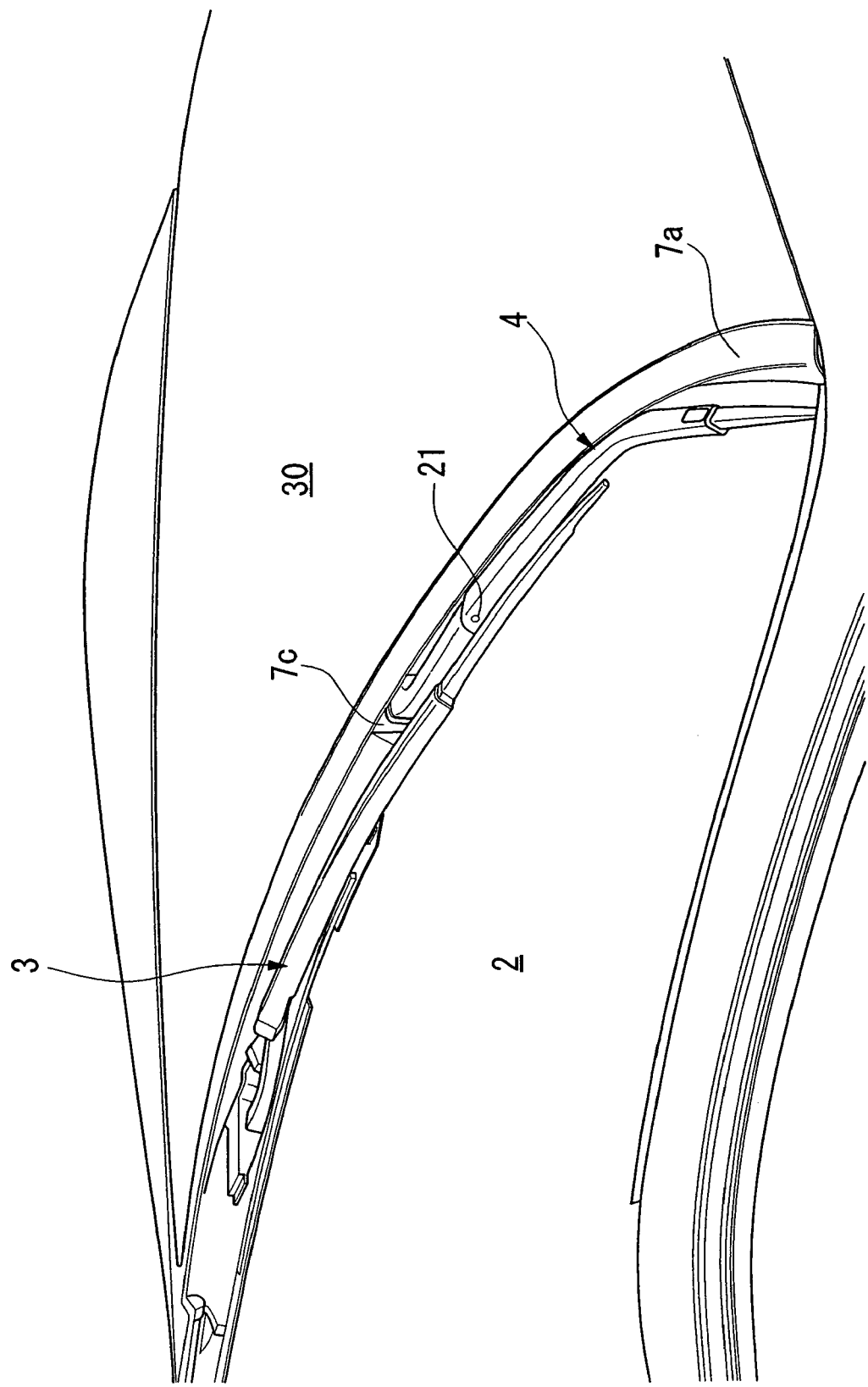
FIG. 5 is a perspective view of a circumference of a front window glass.

As shown in FIG. 4 and FIG. 5, the cowl top garnish 7 and the cowl top upper garnish 7a which is attached to the cowl top garnish 7 are resinous members which are arranged along a vehicle width direction between an lower portion of a front window glass 2 and a rear end of a hood 30, and constitute an upper wall of a cowl box portion 17 which is shown in FIG. 1. A large number of holes 18 which lead rain water to the inside are formed in an upper surface of the cowl top garnish 7, and the rain water is led to the two end sides of the cowl box portion 17 and is drained. Moreover, the outside air which is introduced from the large number of holes 18 is led to a outside air introduction port within the cowl box portion 17. Furthermore, the cowl top upper garnish 7a is attached to the upper portion of the cowl top garnish 7, and thereby the base portion side of each wiper apparatus 3 and 4 is covered, while the large number of holes 18 are covered.

A vertical wall (covering member) 7c is attached so that the vertical wall 7c is disposed between the cowl top garnish 7 and the cowl top upper garnish 7a, and an operation hole 25 which penetrates the arc-shaped arm base portion 20 of the second wiper apparatus 4 is formed in the vertical wall 7c. Note that, as shown in FIG. 4, a pressing portion 7d which presses the vertical wall 7c to a position corresponding to the vertical wall 7c is provided at a backside of the cowl top upper garnish 7a.

Figure 6:
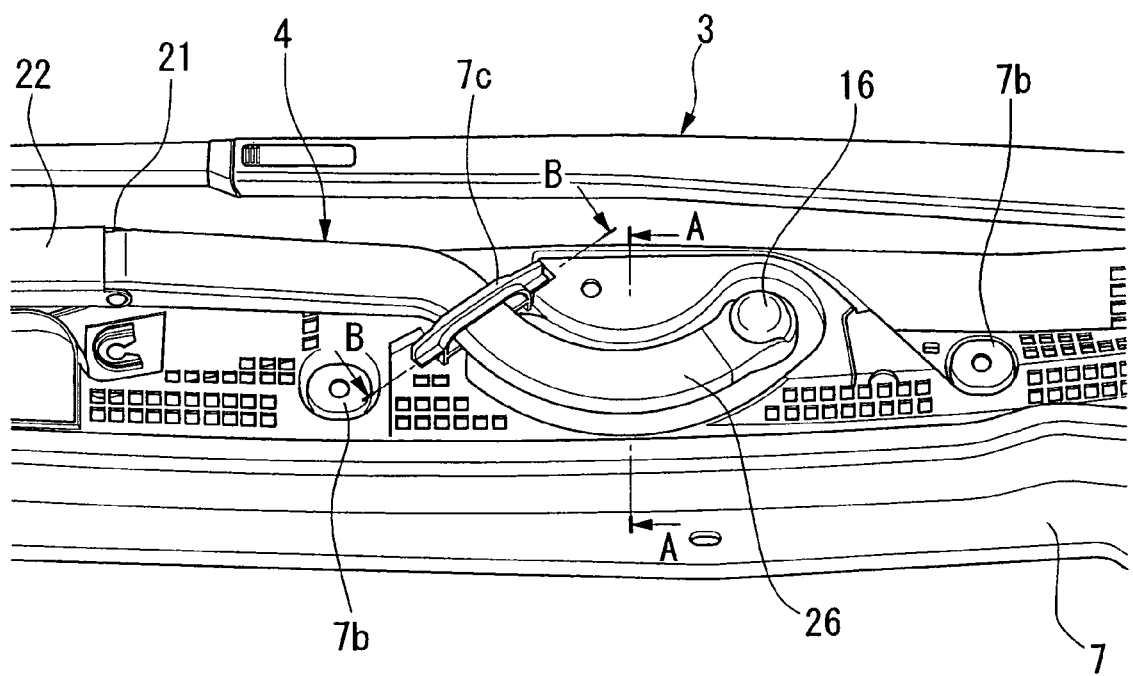
FIG. 6 is a principal portion enlargement view of FIG. 2.
Figure 7:
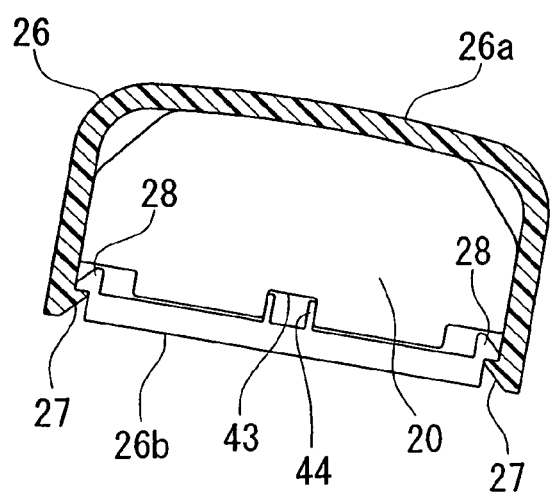
FIG. 7 is a cross-sectional view along an line A-A of FIG. 6.

As shown in FIG. 6, a resinous cover part 26 is provided at an outer periphery of the arc-shaped arm base portion 20. As shown in FIG. 7, the cover part 26 is composed of a cover body 26a which covers an upper wall and a side wall of the arc-shaped arm base portion 20, and base plate 26b. The cover body 26a is provided with an inner prong 27 toward the inside at the lower edges of the side walls, an outer prong 28 is formed to the side edge portion of the base plate 26b, the inner prong 27 of the cover body 26a is engaged to the outer prong 28 from the outside, and the cover body 26a is attached to the base plate 26b. Note that a rib 44 which is engaged in a recess portion 43 formed at an undersurface of the arc-shaped arm base portion 20 is provided to a center portion of an upper surface of the base plate 26b.

As shown in FIG. 4, a resinous cover 45 is attached to a peripheral edge of the operation hole 25 of the vertical wall 7c. The cover 45 surrounds the periphery of the cover part 26 which covers the outside of the arc-shaped arm base portion 20, and unlimitedly lessens a clearance between the operation hole 25 and the outside of the arc-shaped arm base portion 20.

Furthermore, the wiper blade 13 is attached to the shank 12 of the first wiper apparatus 3 and the shank 22 of the second wiper apparatus 4.

Next, the wiper blade 13 is explained. Here, because the wiper blade 13 is common to the first wiper apparatus 3 and the second wiper apparatus 4, in the following explanation, an example of the first wiper apparatus 3 is explained.

Figure 8:
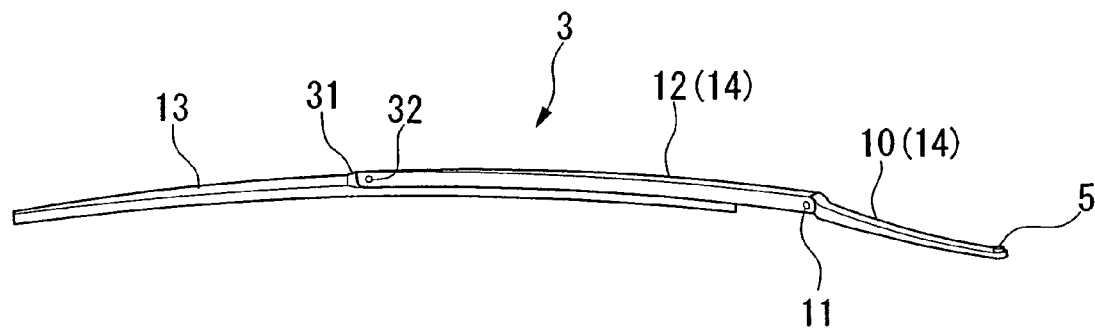
FIG. 8 is a front view of the wiper apparatus.
Figure 9:
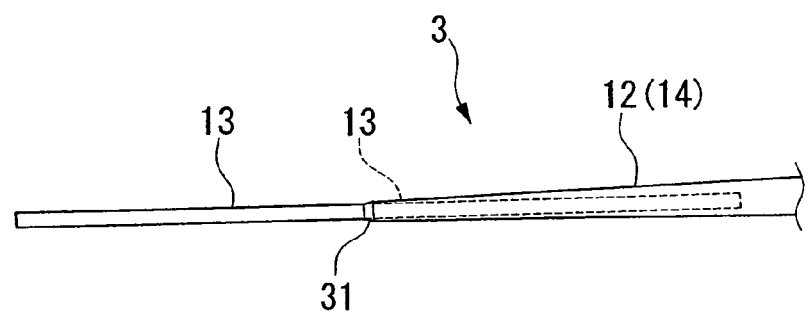
FIG. 9 is a plan view of FIG. 8.
Figure 10:
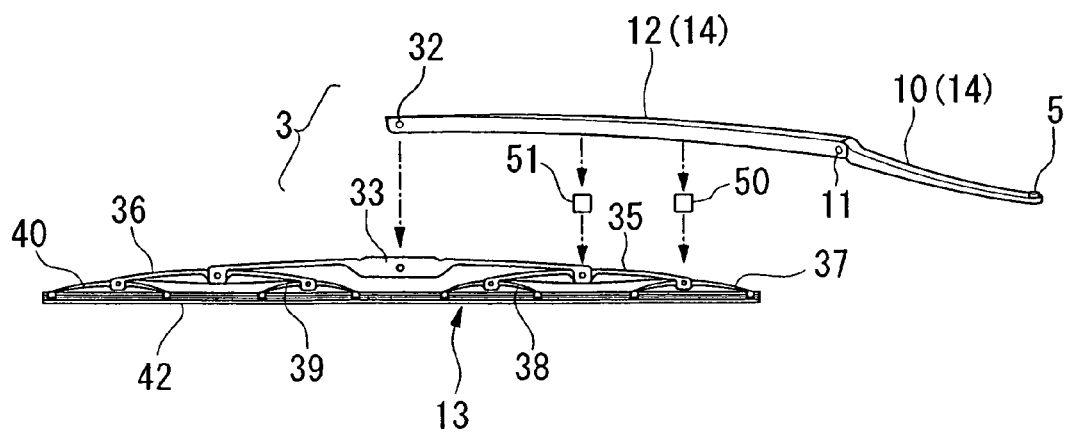
FIG. 10 is an exploded front view of FIG. 8.

As shown in FIGS. 8 to 10, the shank 12 is a metallic member which has a U-shaped cross section, and the wiper blade 13 is shakably supported by the front end portion of the shank 12 in the state of being arranged at the inside of the shank 12.

As mentioned above, the shank 12 is supported by the arm base portion 10 so that the shank 12 can stand elastically, and thereby when the front window glass 2 is cleaned, or the like, a part of the shank 12 is bent at a hinge portion 11, and can be stood opposing a spring (not shown in the figures).

A resinous finisher 31 is attached to the front end portion of the shank 12, and is attached between the shank 12 and the wiper blade 13, a clearance between the front end portion of the shank 12 and the wiper blade 13 is not visible from the outside, and thereby an impression that the two sides are connected is given.

As shown in FIG. 10, the wiper blade 13 is provided with a primary arm 33 which is supported on the shank 12 by a pin 32, and two secondary arms 35 and 36 which are shakably supported at the two end portions of the primary arm 33 by the pin, and has a tournament structure in which yokes 37, 38, 39, and 40 are shakably supported by the two end portions of each secondary arm 35 and 36 by the pin. Furthermore, a blade body 42 is attached to the two end portions of each of four yokes 37, 38, 39, and 40.

Note that a first stabilizer 50 and a second stabilizer 51 are disposed from the base portion side toward the rotary end side of the first wiper apparatus 3 between the shank 12 of the wiper arm 14 and the wiper blade 13. Each stabilizer 50 and 51 is formed in a U-shaped cross shape, is fitted into the inside of the shank 12, and is attached to the shank 12.

Next, the vertical wall is concretely explained with reference to FIGS. 11 and 12.

Figure 12:
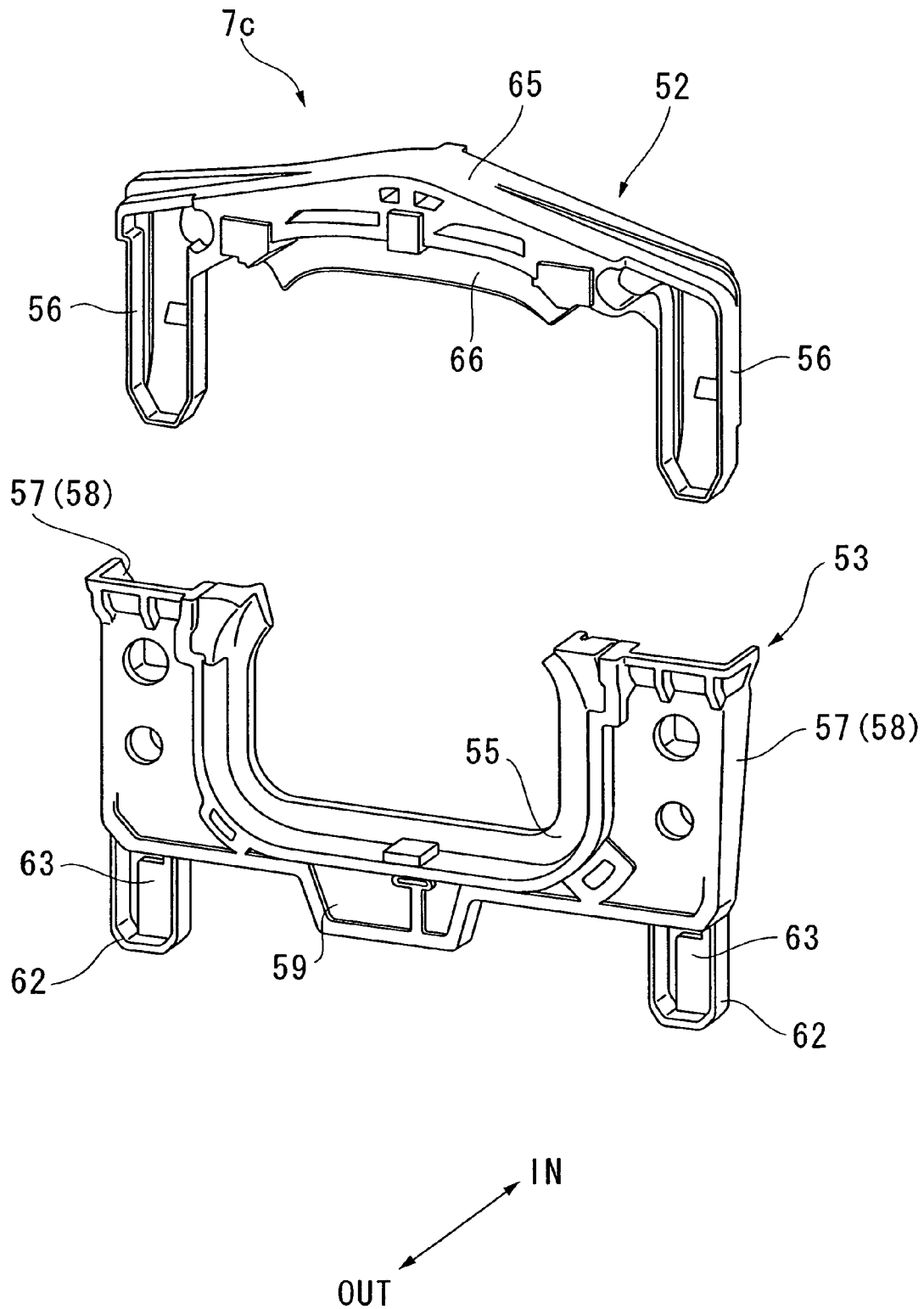
FIG. 12 is an exploded perspective view of a vertical wall.

Note that, in FIG. 12, an inside direction of the vehicle is shown as "IN", and an outside direction of the vehicle is shown as "OUT".

Figure 11:
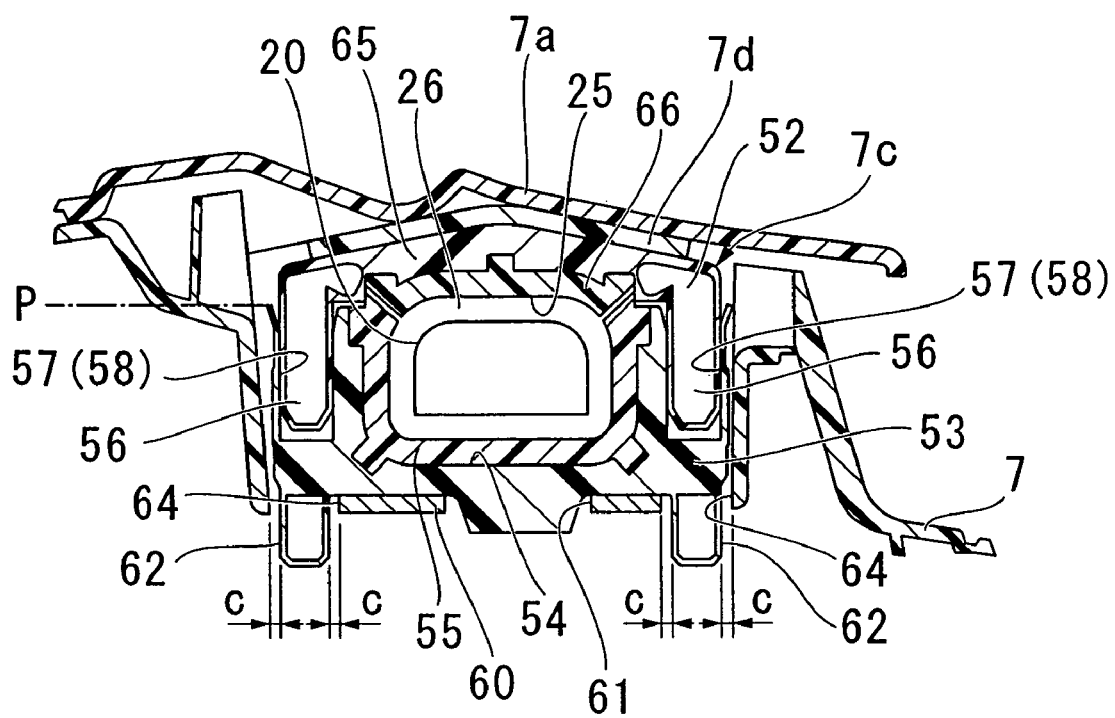
FIG. 11 is a cross-sectional view along a line B-B of FIG. 6.

As shown in FIG. 11 and FIG. 12, the vertical wall 7c is made of a hard resin, is arranged between the cowl top upper garnish 7a and the cowl top garnish 7, and is provided so as to be attachable and detachable. The vertical wall 7c is composed of an upper vertical wall 52 and a lower vertical wall 53, these can be divided into an upper part and an lower part at a partition line P (shown by a chain line in FIG. 11) along an upper edge of the operation hole 25. The above-mentioned operation hole 25 is formed by the upper vertical wall 52 and the lower vertical wall 53.

The recess portion 54 which constitutes the above-mentioned operation hole 25 is formed in a central portion of the lower vertical wall 53. An opening portion is formed in the upper part of the recess portion 54, and a lower cover 55 is integrally attached to the inner periphery of the recess portion 54. The lower cover 55 is a elastic material in which a compound molding of a rubber and a polypropylene is performed, and an inner peripheral edge is formed so that the inner periphery edge is inclined toward the outside direction of the vehicle. Therefore, even if the lower cover 55 interferes with the arc-shaped arm base portion 2, the operation of the arc-shaped arm base portion 20 is not prevented, and thereby an entry of dust and the like can be prevented. Note that the lower cover 55 is not restricted to the compound molding of the rubber and the polypropylene, and may be an elasticity material which has a low frictional resistance (the same may be applied to the upper cover to be mentioned below).

Moreover, at both left and right sides of the inside of the vehicle of the lower vertical wall 53, a U-shaped cross shape of guide 57 which guides the leg portions 56 of the after-mentioned upper vertical wall 51 is formed along the upper and lower direction. A periphery edge of an upper opening portion of the guide 57 is formed spreading to an upper and outside direction in order to facilitate the provision of the leg portions 56 of the upper vertical wall 52. Furthermore, at a lower portion than the peripheral edge of the upper opening portion of the guide 57, a side edge of the inside of the vehicle of the side wall 58 is formed inclining a little toward the U-shaped inside. For this reason, the side wall 58 is spread by inserting the leg portions 56 of the upper vertical wall 52 into the guide 57, and the leg portions 56 of the upper vertical wall 52 are insertingly and elastically held by the side wall 58.

An insertion block 59 is formed projecting below at a lower center portion of the lower vertical wall 53. The insertion block 59 is used for securing the strength in the insertion direction of the arc-shaped arm base portion 20 of the lower vertical wall 53, and has an approximate trapezoid form from the front view which becomes narrow toward the lower part. On the other hand, a guide hole 61 is formed at a position corresponding to the insertion block 59 at a bottom wall 60 of the cowl top garnish 7. The guide hole 61 is formed slightly wider than the insertion block 59. That is, because the insertion block 59 is formed be approximate trapezoidal from the front view, and the guide hole 61 is broadly formed, the insertion block 59 is smoothly inserted into the guide hole 61, and can be easily positioned.

Leg portions 62 are formed so as to extend from both sides of left and right at the under surface of the lower vertical wall 53.

Nails 63 which are formed so as to incline toward the upper part are provided to the inside of the vehicle of the leg portions 62.

On the other hand, an engaged hole 64 is formed at a position corresponding to each leg portion 62 at the bottom wall 60 of the cowl top garnish 7. That is, by inserting the leg portion 62 into the engaged hole 64 of the cowl top garnish 7, the nail 63 of the leg portion 62 is engaged in the engaged hole 64, and a displacement to the upper and lower directions of the lower vertical wall 53 is regulated.

Moreover, as shown in FIG. 11, the engaged hole 64 is formed slightly wider than the width of the leg portion 62 of the lower vertical wall 52, and a clearance C between the engaged hole 64 and the leg portion 62 is secured. Thereby, the displacement of the lower vertical wall 53 to the inner and outer direction of the vehicle is limited, the displacement of the lower vertical wall 53 to a horizontal direction along a width direction, that is, along the extending direction is allowed only within the clearance C between the leg portion 62 and the engaged hole 64.

In addition, the upper vertical wall 52 is formed to an arc-shaped by a shoulder portion 65 which is formed inclining from an upper central portion to lower left and right sides, leg portions 56 which is molded extending from both ends of the shoulder portion 65 to the substantially central portion of the upper and lower direction of the lower vertical wall 53. A lower end of the leg portion 56 is gradually formed narrowly toward the lower part in order to facilitate the insertion of the lower vertical wall 53 into the guide 57, and thereby the insertion of leg portion 56 into the guide 57 can be smoothly performed.

On the other hand, an upper cover 66 which constitutes a part of the cover 45 is integrally attached to the lower central surface of the shoulder portion 65. As well as the above-mentioned lower cover 55, the upper cover 66 is the elasticity material in which a compound molding of a rubber and a polypropylene is performed, the inner periphery of the upper cover 66 is provided inclining a little toward the outside direction of the vehicle. In the state in which the upper vertical wall 52 is attached to the lower vertical wall 53, a connected ring-shaped cover 45 is constituted by the upper cover 66 and the lower cover 55. That is, the vertical wall 7c which is constituted by the upper vertical wall 52 and the lower vertical wall 53 has a left-right symmetric shape. Note that the upper cover 66 and the lower cover 55 may be attachably and detachably provided to the lower vertical wall 53 and the upper vertical wall 52, respectively.

According to the above-mentioned embodiment, when the pivot axes 5 and 6 are rotated by the driving device which is not shown in figure, the wiper arm 14 rotates about the center of the pivot axis 5 in the first wiper apparatus 3, and the wipering of the front window glass 2 is performed by the wiper blade 13.

On the other hand, in the second wiper apparatus 4, when the pivot axis 6 is driven, the operation lever 15 is moved, and the supporting shaft 16 is moved in an arc. Then, the motion is repeated in which the arc-shaped arm base portion 20 moves to outside from the operation hole 25 of the vertical wall 7c, and returns to inside from the operation hole 25, and the wiper blade 13 of the wiper arm 24 wipes the front window glass 2 by the movement of the arc-shaped arm base portion 20.

Therefore, by the arc-shaped arm base portion 20 which is pushed out drawing an arc-shaped locus in the second wiper apparatus 4, a more distant wiping can be performed, and because it is not necessary to provide a complicated linkage, the wipered area can be expanded by a simple movement, and an efficient operation becomes possible.

Here, because the pivot axis 5 which constitutes the base portion side of the wiper arm 24, the base end side of the arc-shaped base portion 20, the operation lever 15, and the supporting shaft 16 are covered with cowl top upper garnish 7a, the arc-shaped arm base portion 20 moves in and out from the operation hole 25 of the vertical wall 7c which is provided so as to be disposed between the cowl top garnish 7 and the cowl top upper garnish 7a, the appearance quality of the surroundings of the front window glass 2 can be improved, while the operation hole 25 becomes blocked by the arc-shaped arm base portion 20 of the wiper arm 24, and thereby the entry of the foreign matter from this portion can be prevented.

In particular, because the arc-shaped arm base portion 20 which penetrates the operation hole 25 is formed in the arc-shaped at the center of the pivot axis 6 which is the rotary shaft of the operation lever 15, even if the operation lever 15 is drived, the arc-shaped arm base portion 20 merely moves in and out of the operation hole 25, the clearance between the arc-shaped arm base portion 20 and the operation hole 25 can be unlimitedly minimized, and thereby the entry of the foreign matter can be reliably prevented.

In particular, because the cover 45 is attached to the operation hole 25, the above-mentioned clearance can be mostly omitted. Furthermore, because the outer periphery of the arc-shaped arm base portion 20 is protected by the cover part 26, a direct contact between the arc-shaped arm base portion 20 and the operation hole 25 (more exactly, the cover 45) can be prevented by the cover part 26, and thereby the wear or the paint peeling of the arc-shaped arm base portion 20 can be prevented. Therefore, because the wear or the paint peeling of the arc-shaped arm base portion 20 can be prevented, the clearance between the arc-shaped arm base portion 20 and the operation hole 25 can be unlimitedly lessened. Therefore, the entry of the foreign matter from this portion can be reliably prevented.

Moreover, because the vertical wall 7c having the operation hole 25 is attachably and detachably provided, even if the arc-shaped arm base portion 20 is in contact with the cover 45, and the cover 45 is worn away, a replacement operation can be easily performed. Furthermore, because, when the wiper arm 24 is attached, the wiper arm 24 is dropped into the recess portion 54 of the lower vertical wall 53, and the wiper arm 24 can be stabilized, the burden on the worker can be reduced.

Furthermore, because the cover 45 is made from the elasticity material, the clearance C between the leg portion 62 and the engaged hole 64 is secured, even if the dispersion of the operation range of the wiper arm 24 due to the attachment error arises, the dispersion is allowed, and the entry of the foreign matter can be prevented. Furthermore, by setting the above-mentioned partition line P to the position along the upper edge of the operation hole 25, an width for engaging between the upper vertical wall 52 and the lower vertical wall 53 can be widely secured, and thereby the attachment reliability can be improved.

In particular, because the vertical wall 7c is formed to the left-right symmetric shape, the identical vertical wall can be used for the vehicles of right steering specification and left steering specification, and thereby the reduction of the cost can be attained.

In addition, the present invention is not limited to the above-mentioned embodiment, for example, the present invention can be applied to the wiper apparatus of a rear window glass, rather than the front window glass.

While preferred embodiments of the invention have been described and illustrated above, it should be understood that these are exemplary of the invention and are not to be considered as limiting. Additions, omissions and substitutions, and other modifications can be made without departing from the spirit or scope of the present invention. Accordingly, the invention is not to be considered as being limited by the foregoing description, and is only limited by the scope of the appended claims.

What is claimed is:

1. A wiper apparatus comprising:
    an operation lever of which one end portion is rotatably equipped;
    a wiper arm attached to another end portion of the operation lever; and
    a stationary covering member covering a base portion side of the wiper arm and the operation lever;
    wherein an operation hole is formed in a vertical wall of the covering member to allow a base portion of the wiper arm to penetrate through,
    wherein the stationary covering member is fixed at a vehicle body, and
    wherein a penetrating portion of the wiper arm, which penetrates the operation hole, is arc-shaped with a radius of curvature centered at the pivot axis of a rotary shaft of the operation lever.

2. A wiper apparatus according to claim 1, wherein a cover part is provided at an outer periphery of the penetrating portion.

3. A wiper apparatus according to claim 1, wherein the vertical wall is removably attached to the covering member.

4. A wiper apparatus according to claim 3, wherein the covering member is a cowl top garnish, and the vertical wall is attached to the cowl top garnish engaging the cowl top garnish.

5. A wiper apparatus according to claim 3, wherein the vertical wall is divided into an upper part and a lower part at a portion to which the operation hole is provided.

6. A wiper apparatus according to claim 3, wherein the vertical wall is allowed a predetermined quantity of displacement toward a horizontal direction along an elongation direction.

* * * * *